Feb. 6, 1923.

H. F. PERKINS.
PROCESS OF FRACTIONATION.
FILED JULY 2, 1919.

1,444,208.

WITNESSES
J. Herbert Bradley.
Francis J. Tomasson

INVENTOR
Harry F. Perkins
by Christy & Christy
his attorneys.

Patented Feb. 6, 1923.

1,444,208

UNITED STATES PATENT OFFICE.

HARRY F. PERKINS, OF PITTSBURGH, PENNSYLVANIA, ASSIGNOR TO ROSANOFF PROCESS COMPANY, OF PITTSBURGH, PENNSYLVANIA, A CORPORATION OF DELAWARE.

PROCESS OF FRACTIONATION.

Application filed July 2, 1919. Serial No. 308,145.

*To all whom it may concern:*

Be it known that I, HARRY F. PERKINS, residing at Pittsburgh, in the county of Allegheny and State of Pennsylvania, a citizen of the United States, have invented or discovered certain new and useful Improvements in Processes of Fractionation, of which improvements the following is a specification.

My invention relates to the separation, by distillation and fractionation, of a complex mixture of liquids into two mixtures one of which is lighter and the other heavier than the original complex mixture. It consists in a new process which I have discovered, and which I have practically used on a commercial scale for the separation of gasoline from crude petroleum, with a greater yield of gasoline of the quality desired, per unit of oil treated, than is obtainable by any other commercial process known to me.

In the process which I have discovered, crude oil is distilled in the ordinary manner except that the rate of distillation may be increased very substantially above present practice. The vapors resulting from the distillation are first cooled uniformly to a constant temperature which is lower than the initial boiling point of the residue. By such cooling, the particles of vapor which contain none of the hydro-carbons desired in the gasoline are condensed and the condensate returned to the still, or otherwise disposed of. The cooled vapors are then passed through a dephlegmator, after which they are uniformly cooled to a constant temperature which is substantially the dry-point temperature of the desired gasoline. By this second cooling of the vapors, the heavier hydrocarbons, which, if condensed with the entire body of vapor passed through the dephlegmator, would raise the required dry-point temperature of the gasoline, are condensed and caused to flow downwardly through the dephlegmator. The dephlegmator is so constructed that the ascending vapors and descending distillate are brought into intimate contact in finely subdivided particles, with the result that the ascending vapors partially re-distilled the descending distillate. It is in this sense that the term "dephlegmator" is used herein. Finally, the vapors, uncondensed when cooled to substantially the dry-point temperature of the desired gasoline, are condensed in any well known or desired type of condenser.

Figure 1:
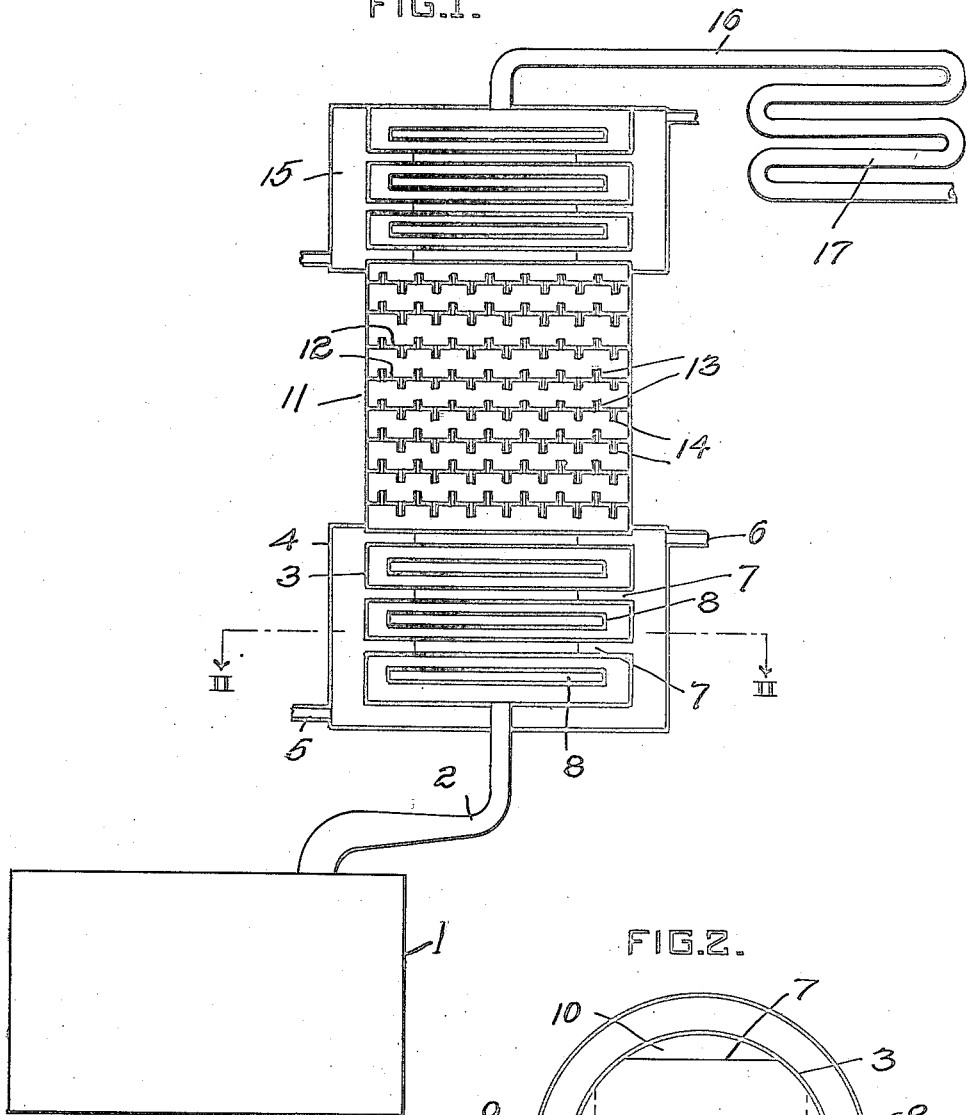
Figure 2:
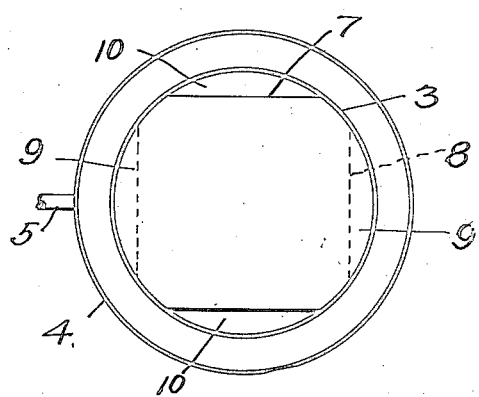

The process may be practiced by the use of various types of apparatus, one of which is diagrammatically illustrated in the accompanying sheet of drawings in which Figure 1 is a vertical central sectional view of the apparatus, and Figure 2 a transverse sectional view taken on the line II—II, Figure 1.

The vapors formed in a still 1, heated in any suitable manner, may pass upwardly through a conduit 2 into the lower end of a cooling chamber shown as formed at the bottom of a dephlegmator. The outer wall 3 of the cooling chamber is surrounded by a jacket 4 through which a cooling fluid is circulated, the jacket being provided with an inlet 5 and an outlet 6. To circulate the vapors and cooling fluid so that the former may be cooled uniformly by the latter, flat fluid conduits 7 and 8 extend alternately from one side to the other of the jacket at right angles to each other. The vapors discharged from the conduit 2 follow a circuitous path, flowing first laterally below the first conduit 8, then upwardly through side passages 9 formed between the wall 3 and the sides of the conduit 8, then horizontally between adjacent faces of conduits 7 and 8, then upwardly through side passages 10 formed between the sides of conduit 7 and the wall 3, and so on until they flow into the lower end of the dephlegmator. The condensate formed in the cooling chamber flows in the opposite direction to the flow of the vapors, it being characteristic of the structure that the flowing condensate is supported in a thin film adjacent to the vapors which are maintained in thin layers adjacent to the cooled surfaces of the cooling fluid conduits.

As previously stated, the dephlegmator is so constructed that the ascending vapors and descending distillate are brought into intimate contact with each other. For this purpose the dephlegmator may consist of a vertical shell 11 having a plurality of transverse perforate plates 12. In the openings in these plates there may be secured a plurality of small bore pipes or capillary tubes 13 and 14, the tubes 13 extending upwardly and being for the passage of vapors, and the tubes 14 extending downwardly for the passage, primarily, of condensate. Thus the condensate flowing downwardly from one to another of the plates 12 will be divided into drops or into very small streams in contact with the vapors between each adjacent pair of plates. For further subdividing the vapors and distillate, the dephlegmator 11, either with or without the plates 12, may be provided with mineral wool, or the like.

The cooling chamber 15 at the top of the dephlegmator may be constructed the same as that at the bottom thereof, and hence requires no further explanation. After the vapors pass through the top cooling chamber they may be conducted through a conduit 16 to a suitable condenser 17 in which they are condensed to liquid gasoline.

As a specific example of the temperatures which may be maintained in the cooling zones, I have, in the distillation of Pennsylvania crude for the recovery of gasoline having a dry point temperature of 220° C., maintained the lower temperature zone at 230° C., which is below the initial boiling point of the residue, and the upper cooling zone at 220° C. At such temperatures, I have, on a commercial scale, recovered 41 per cent of the crude as gasoline having a dry point temperature of 220° C., and otherwise meeting the physical requirements of gasoline as to average boiling point, initial boiling point and gravity. In a similar manner, I have from the same crude oil, obtained a yield of 33 per cent of gasoline having a dry point temperature of 183° C.

If it is desired to obtain a cut other than that just described, the temperature of the top cooling zone should be maintained at the dry point temperature of the required cut. After the gasoline has been removed from the crude oil, the kerosene may be recovered in similar manner by maintaining the temperature of the top cooling zone at about the required dry point temperature of the kerosene and the temperature of the lower cooling zone at a temperature below the initial boiling point of the residue but above the temperature of the top cooling zone. The two cuts, gasoline and kerosene, may be removed separately by one apparatus or, in part, simultaneously by using two sets of apparatus arranged successively. The distillation may be effected either in batch or continuously and at a rate substantially above that of present practice. In the case of continuous distillations, the temperature of the top cooling zone may advantageously be maintained several degrees lower than the dry point temperature of the required distillate. Instead of providing a relatively short dephlegmator and a cooling zone at the top thereof, the dephlegmator may be lengthened to such an extent that the vapors will, by passing through it, be cooled uniformly to the dry point temperature of the desired cut.

While I have described my invention in its adaptability to the separation of gasoline from petroleum, it manifestly is applicable to the recovery of gasoline or other cuts from other hydrocarbon mixtures such as coal or shale oil, and by extension the process is applicable to the separation of any complex mixture of liquid into two mixtures, a heavier and a lighter, the lighter having a required dry point temperature.

I claim as my invention:

1. The process of separating a mixture of liquid substances of different volatility into a lighter substance and a heavier residue, which consists in distilling the mixture, cooling the vapors of distillation to a temperature lower than the initial boiling point of the residue to be obtained, passing the cooled uncondensed vapors through a dephlegmator in contact with condensate and cooling the vapors passed through the dephlegmator to substantially the dry point of the lighter substance to be obtained, and then condensing the uncondensed vapors.

2. The process of obtaining gasoline from a hydrocarbon mixture containing it which consists in distilling the mixture, cooling the vapors of distillation to a temperature lower than the initial boiling point of the residue to be obtained, passing the cooled uncondensed vapors through a dephlegmator in contact with condensate and cooling the vapors passed through the dephlegmator to substantially the dry point of the gasoline to be obtained, and then condensing the uncondensed vapors.

In testimony whereof I have hereunto set my hand.

HARRY F. PERKINS.

Witnesses:
  PAUL N. CRITCHLOW,
  FRANCIS J. TOMASSON.